Figure 1:
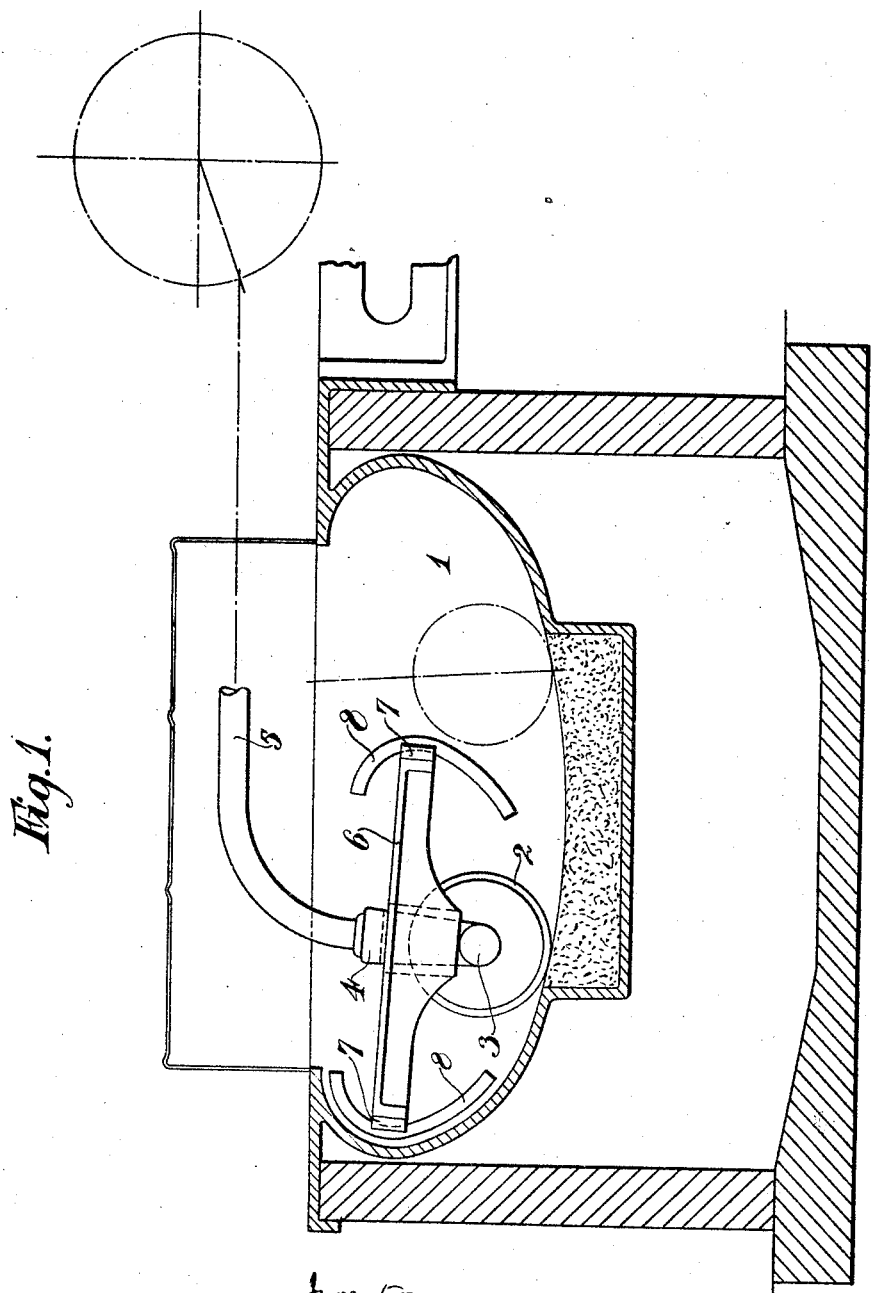

Dec. 1, 1925.  1,563,898
F. G. FRYER
CONCH FOR THE MANUFACTURE OF CHOCOLATE
Filed Nov. 10, 1922    2 Sheets-Sheet 1

Dec. 1, 1925.  1,563,898
F. G. FRYER
CONCH FOR THE MANUFACTURE OF CHOCOLATE
Filed Nov. 10, 1922   2 Sheets-Sheet 2

Patented Dec. 1, 1925.

1,563,898

UNITED STATES PATENT OFFICE.

FREDERICK GEORGE FRYER, OF YORK, ENGLAND.

CONCH FOR THE MANUFACTURE OF CHOCOLATE.

Application filed November 10, 1922. Serial No. 600,134.

*To all whom it may concern:*

Be it known that I, FREDERICK GEORGE FRYER, a subject of the King of the United Kingdom of Great Britain and Ireland, residing at 9 St. Peter's Grove, York, England, have invented certain new and useful Improvements in Conches for the Manufacture of Chocolate (for which I have filed an application in Great Britain on 23rd November, 1921), of which the following is a specification.

This invention relates to conches used in the manufacture of chocolate and has for its object not only to improve the action of these machines by enabling them to liquefy more rapidly chocolate which has been placed in them in a too stiff or insufficiently heated state but also to accelerate the normal conching action of the machines on chocolate in the proper condition of fluidity, that is, to rub and agitate said chocolate to a very increased extent.

Conch machines vary in details of design but in their main characteristics they are similar, and comprise a trough or pot provided with means of attrition for rubbing and/or agitating the chocolate contained therein. Said means usually consist of a roller (or rollers) which is reciprocated horizontally in the trough or pot by suitable arms or other driving members.

According to the present invention, there are provided a number of bars, prongs or like stirring or raking means, which are arranged in front of and/or behind the agitating and/or rubbing means and travel with the said agitating and/or rubbing means backwards and forwards through the chocolate. Further, similar stirring or raking means may also, if desired, be arranged on one or both sides of the agitating means. In the case of a conch of the usual type the said stirring or raking means are suitably fitted to the arms or other members whereby the reciprocating roller (or rollers) is driven.

The stirring or raking means are so mounted that they do not make contact with the bottom or sides of the conch.

Hitherto when chocolate in a too stiff or insufficiently heated condition has been placed in a conch, the roller has tended to push a portion of it into the clearance space at each end of the trough where it has remained for a considerable time during which it has been punched by the roller, by which action the machinery may become unduly strained. Eventually, if the chocolate has contained enough fat, the chocolate has become liquefied and the conch has commenced its proper normal mode of operation. When a machine improved in accordance with the present invention is employed, the bars, scrapers, prongs or the like not only continually rub, rake or displace the stiff chocolate which has accumulated in the clearance space but also that chocolate which is in the normal path of the roller, the result being that the liquefaction of the chocolate is most materially accelerated. It is true that hitherto rotary stirrers or other similar means have been provided for stirring such chocolate lodging in said clearance spaces at the ends of the conch pots, but obviously the means, provided in accordance with this invention, are far superior to said stirrers or the like since the new means are much simpler and their stroke is much longer, and since they absorb less power. It is also clear that when acting on chocolate in the proper condition of fluidity, the new members being continually immersed in the chocolate act as efficient stirrers throughout their stroke and thereby greatly aid the rubbing and stirring action of the rollers.

The improved machines thus possess the advantages firstly, that they bring stiff chocolate into a fluid condition in a much reduced time, secondly, that chocolate in the normal condition of fluidity is stirred or agitated to a much greater extent, so that either the time of the conching operation may be reduced or the amount of chocolate operated upon may be increased since the depth of the mass may be greater, and thirdly, that the power consumed in the manufacture of a given quantity of chocolate is decreased.

An embodiment of the invention is illustrated, by way of example, in the accompanying drawings, in which—

Figure 2:
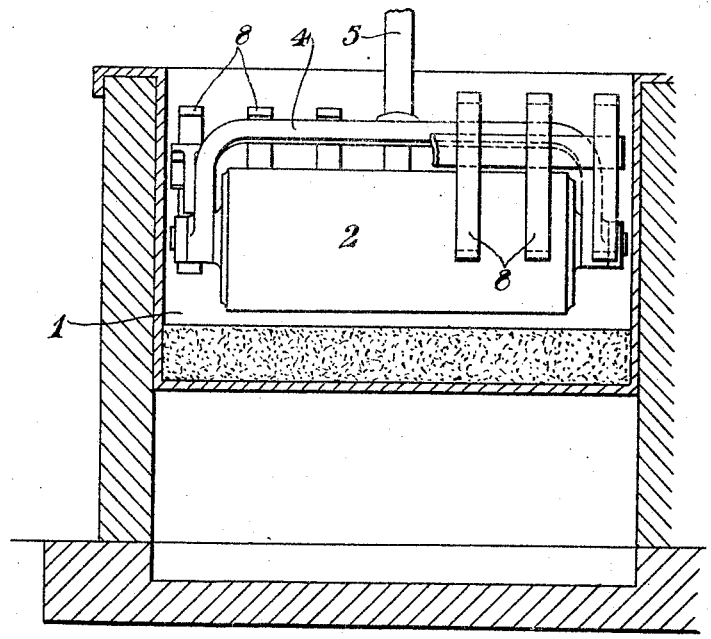
Figure 3:
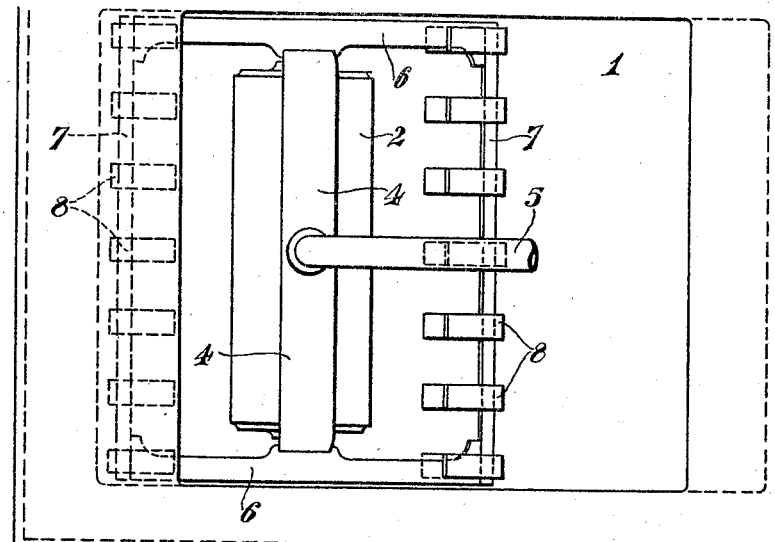

Figs. 1, 2 and 3 represent, in sectional side elevation, sectional end elevation and plan respectively, a conch having a reciprocating roller and provided with new means in accordance with the present invention.

Referring to the drawings, 1 is the pot or trough of the conch which contains the chocolate and in which the roller 2, which is journalled in bearings 3 in the arms of the forked member 4, is reciprocated in the usual manner, between the two extreme positions indicated by the full and dotted lines in the drawing, by means of a rod 5 of which one end is connected to the member 4 and the other end to a suitable crank or eccentric which is illustrated diagrammatically in Fig. 1 of the drawing. The forked member 4 is provided with arms 6 which are fixed thereto by any suitable means and rigidly connected by cross-pieces 7 to which, in accordance with the invention, there are fixed a number of prongs 8 which are shaped correspondingly to the ends of the trough 1. It will thus be seen that as the roller 1 or other means of attrition moves backwards and forwards through the chocolate contained in the pot 1 the prongs 8 will move with it and displace chocolate which tends to collect at the ends of the pot and will at the same time increase the agitating and rubbing effect on that portion of the chocolate which is in the normal path of the roller.

It will be obvious that in the case of a conch having two rollers similar prongs, or the like may be provided in front of and/or behind each of the rollers, and, if other rubbing means are employed instead of rollers, similar prongs or the like may also be fitted thereto.

What I claim is:—

1. In a conch, the combination with a vessel and means movable transversely of the vessel for subjecting the chocolate to attrition, of prongs connected with said means and movable bodily therewith for separately agitating the chocolate.

2. In a conch, the combination with a vessel and means movable transversely of the vessel for subjecting the chocolate to attrition, of prongs directly connected with said means at opposite sides thereof in the direction of movement for separately agitating the chocolate.

3. In a conch, the combination with a vessel and a roller therein for subjecting the chocolate to attrition, of prongs disposed on opposite sides of the roller and movable bodily therewith for separately agitating the chocolate.

4. In a conch, the combination with a vessel, means movable therein for subjecting the chocolate to attrition, a frame connected with said means and prongs connected with said frame in the front and in the rear of said means for separately agitating the chocolate.

5. In a conch, the combination with a vessel, a roller therein for subjecting the chocolate to attrition and prongs disposed at opposite sides of the roller and movable therewith for separately agitating the chocolate, said prongs having a profile corresponding to the shape of the wall of the vessel.

FREREDICK GEORGE FRYER.